US 6,654,372 B1

(12) United States Patent
Arts et al.

(10) Patent No.: US 6,654,372 B1
(45) Date of Patent: Nov. 25, 2003

(54) ALGORITHM TO BYPASS L4 PROCESSING IN AN INTERNET PROTOCOL FORWARDING PROCESSOR

(75) Inventors: Francis Arts, Turnhout (BE); Olivier Didier Duroyon, Mc Lean, VA (US); Anthony Matteo Gallo, Apex, NC (US); Brahmanand Kumar Gorti, Cary, NC (US); Donald Newland Jones, Apex, NC (US); Natarajan Vaidhyanathan, Durham, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,144

(22) Filed: Apr. 5, 2000

(51) Int. Cl.[7] .............................................. H04L 12/56
(52) U.S. Cl. .................... 370/392; 370/395.52
(58) Field of Search ........................... 370/395.52, 392, 370/351, 389

(56) References Cited

U.S. PATENT DOCUMENTS 5,951,651 A * 9/1999 Lakshman et al. .......... 709/239
6,147,976 A * 11/2000 Shand et al. ................ 370/254

* cited by examiner

Primary Examiner—Kenneth Vanderpuye
(74) Attorney, Agent, or Firm—C. Lamont Whitham

(57) ABSTRACT

A controllable mechanism for by-passing Layer 4 (L4) classification is based on the insertion into a set of MAC rules in SA MAC lookup means a set of Layer 4 (L4) Skip Classification Flags. Routing is accomplished by selecting which rule to apply to the packet and reading the state of the corresponding L4 Skip Classification Flag. In response to a first state of said corresponding L4 Skip Classification Flag, performing an L4 classification followed by a routing of the data packet. In response to a second state of said corresponding L4 Skip Classification Flag, reading the state of a Global Classification Flag. In response to a first state of said Global Classification Flag, performing an L4 classification followed by a routing of said data packet. In response to a second state of said Global Classification Flag performing a routing of the data packet. The L4 Skip option change does not use the option change of reading the L4 Skip Classification Flag from the port table, whereas the second embodiment uses this option. The third and fourth embodiments are similar to the first and second embodiments but with the. addition of inserting into a set of Layer 3 (L3) rules in L3 lookup means a set of Layer 4 (L4) Classification Required Flags. The third embodiment does not use the option of reading the L4 Skip Classification Flag from the port table, whereas the fourth embodiment uses this option.

6 Claims, 6 Drawing Sheets

ALGORITHM TO BYPASS L4 PROCESSING IN AN INTERNET PROTOCOL FORWARDING PROCESSOR

BACKGROUND OF THE INVENTION

1. Field of the Invention

The present invention generally relates to routing of packets in a computer network and, more particularly, to a controllable mechanism for by-passing Layer 4 (L4) classification.

2. Background Description

The problem of the design of computer networks is partitioned into smaller subtasks, by dividing the problem into layers. The OSI (Open Systems Interconnection) reference model defines seven layers. This invention is primarily concerned with the protocols of Layer 3, the network layer, and Layer 4, the transport layer. Each layer communicates with its peer layer in another node in the network through the use of a protocol. A multicast address is intended to be destined to a group of nodes, as opposed to a unicast address which is destined for a single node in the network.

The general purpose of packet classification in a switch, is to classify (or identify) packets arriving from a network interface. Actions can be associated with classification rules so that the actions can be applied to matching packets. Furthermore, it is the intention of this design to support this level of packet classification, and to apply the associated actions to the packets at "wire speed".

The Classifier Tree itself is at the core of the Classifier. The tree contains packet-handling rules. Each rule defines what to do with a packet (action) when it matches the criteria specified in the rule (description). Only certain bits (or fields) in a packet are of interest to an individual tree which is inherent to the tree definition. (Individual trees, of course, may be interested in different fields.) Both the tree creator and searcher must agree on which fields define the rules in any given tree. The creator and searcher may execute on different processors, but there must be agreement between the two on how the tree is defined.

Rules are added to the tree by applications. Applications typically (but not always) are tasked with performing one type of action on packets. As long as different applications (e.g., Network Dispatcher, Layer 3 (L3) filtering, Quality of Service (QoS)) are interested in the same packet fields, they can contribute rules to the same trees. In other words, multiple action types are supported in the same tree as long as the contributors agree on what fields in the packet are of interest. Multiple Classifier trees may be supported on the same system. Applications may decide more than one Classifier tree is needed because (for example):

Applications are interested in different fields. It may not be practical for IP (Internet Protocol) and IPX (Internet Packet Exchange) filter rules to share the same table.

Search applications may be interested in only a subset of rules at a particular time. Perhaps one set of actions is relevant to packets as they are received and yet another set of actions is relevant when transmitting packets. Received actions could be placed in one tree, and transmit actions could be placed in another tree.

Normal processing flow, which includes Layer 4 (L4) classification, is slow, especially if the classifier is a Software Managed Tree (SMT) or includes an SMT component.

SUMMARY OF THE INVENTION

It is therefore an object of the present invention to provide a controllable mechanism for by-passing Layer 4 (L4) classification.

According to first and second embodiments of the invention, there is provided a method of routing a data packet which based on the insertion into a set of MAC rules in SA MAC lookup means a set of Layer 4 (L4) Skip Classification Flags. Routing is accomplished by selecting which rule to apply to the packet and reading the state of the corresponding L4 Skip Classification Flag. In response to a first state of said corresponding L4 Skip Classification Flag, performing an L4 classification followed by a routing of the data packet. In response to a second state of said corresponding L4 Skip Classification Flag, reading the state of a Global Classification Flag. In response to a first state of said Global Classification Flag, performing an L4 classification followed by a routing of said data packet. In response to a second state of said Global Classification Flag performing a routing of the data packet. The first embodiment does not use the option of reading the L4 Skip Classification Flag from the port table, whereas the second embodiment uses this option.

The third and fourth embodiments of the invention are similar to the first and second embodiments but with the addition of inserting into a set of Layer 3 (L3) rules in L3 lookup means a set of Layer 4 (L4) Classification Required Flags. The process proceeds by selecting which rule to apply to a packet and reading the state of the corresponding L4 Classification Required Flag. In response to a first state of the corresponding L4 Classification Required Flag, performing an L4 classification followed by a routing of the data packet. In response to a second state of said corresponding L4 Classification Required Flag, reading the state of the corresponding L4 skip Classification Flag. The remaining procedure is as with the first and second embodiments. The third embodiment does not use the option of reading the L4 skip Classification Flag from the port table, whereas the fourth embodiment uses this option.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
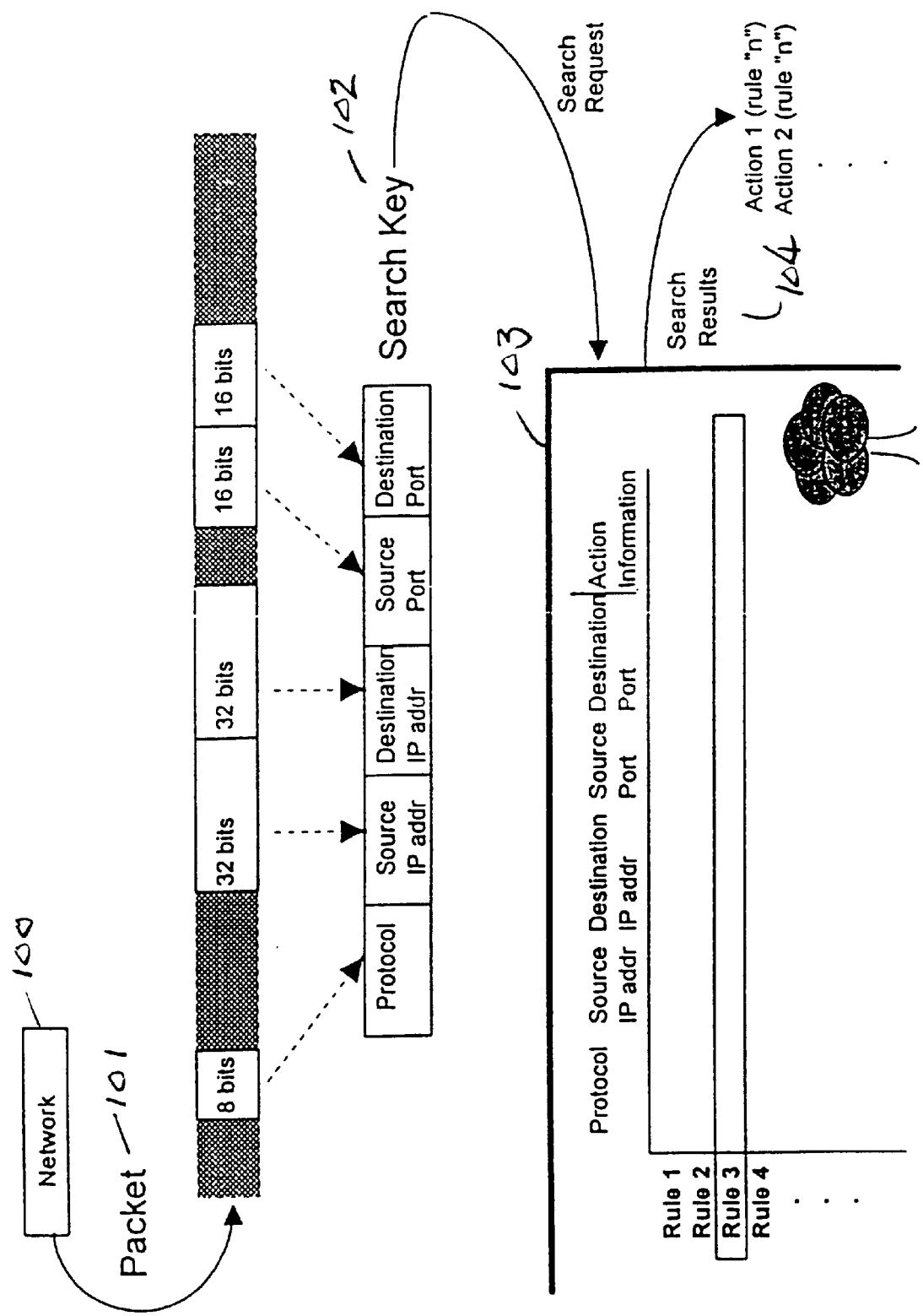
FIG. 1 is data flow diagram illustrating one sub-procedure of a frame routing procedure performed in an Internet protocol (IP) forwarding processor.

Referring now to the drawings, and more particularly to FIG. 1, there is shown an illustration of the use of a Classifier tree. A packet 101 arrives from network 100. A search key 102 is constructed from packet data (based on which tree you want to search since the tree definition defines which fields need to be included in the key). A search is made the tree 103 using the key. Notice that it may help to think of the Classifier rule "tree" as a "table of rules". The search produces action(s) 104 that must be applied to the packet.

Figure 2:
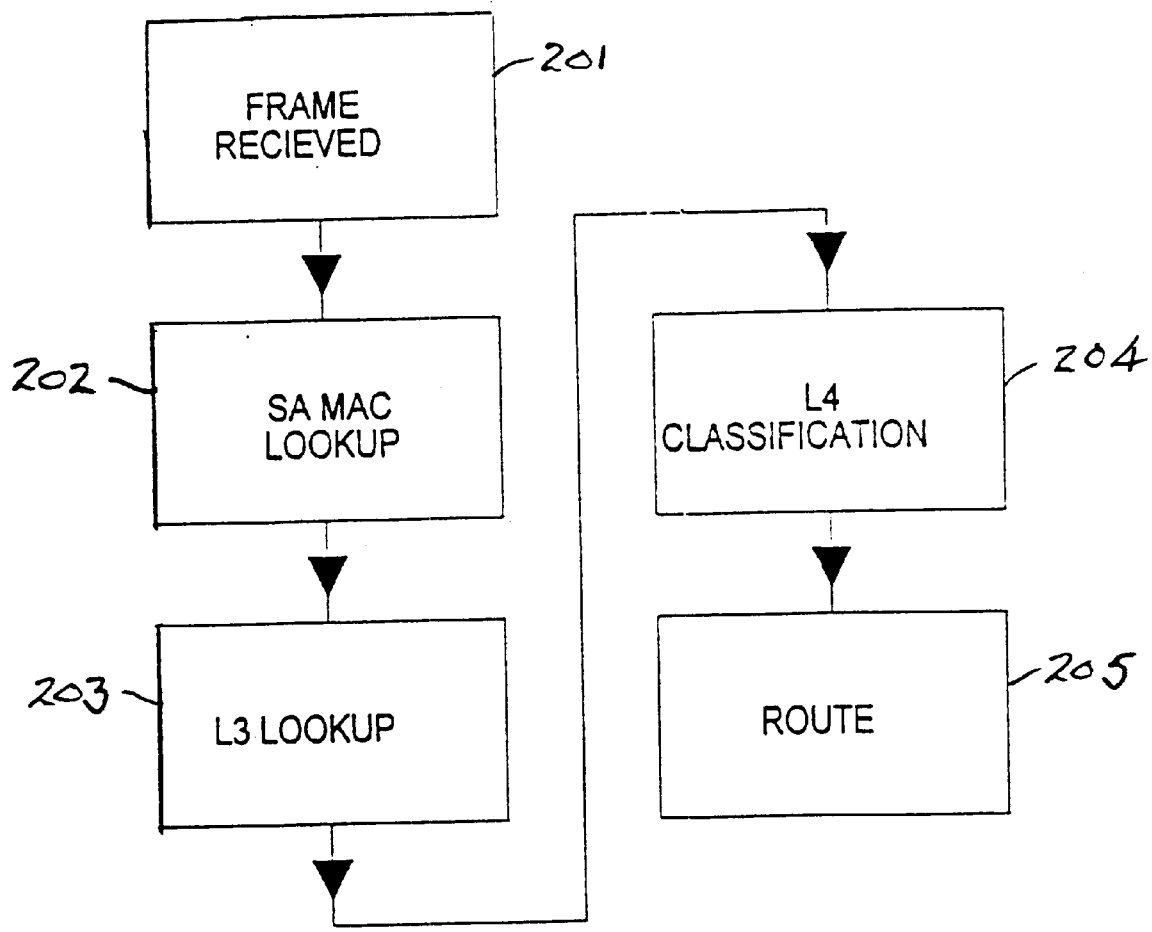
FIG. 2 is a flowchart illustrating one method of frame routing.

The above L4 classification sequence is one sub-procedure of a frame routing procedure performed in an Internet protocol forwarding processor. FIG. 2 is a flowchart illustrating one method of frame routing practiced today. A frame is received in function block 201. First, a Source Address (SA) Media Access Control (MAC) lookup is done in function block 202, then an L3 lookup in function block 203, then an L4 classification in function block 204, and finally the frame is routed in function block 205.

The present invention discloses a method for invoking L4 Internet Protocol (IP) processing and L4 IPX in a L3 switching environment using Network Processors (NP) to improve performance. Several mechanisms are provided which may be switched ON and OFF.

Key to the invention is the creation and use of three flags. The first Flag is an L4 Classification Required Flag in the leaf(s)of the L3 IP routing tree. The second flag is a Global Classification Flag and is set in memory. The third flag is an L4 Skip Classification Flag and is set in Source Address (SA) Media Access Control (MAC) tree leaf.

The invention comprises four embodiments. The first and second use the L4 Classification Required Flag and the L4 skip Classification Flag. The third and fourth utilizes all three Flags, the L4 Classification Required Flag, the L4 skip Classification Flag, and the Global Classification Flag.

Figures 3A, 3B, 3C:
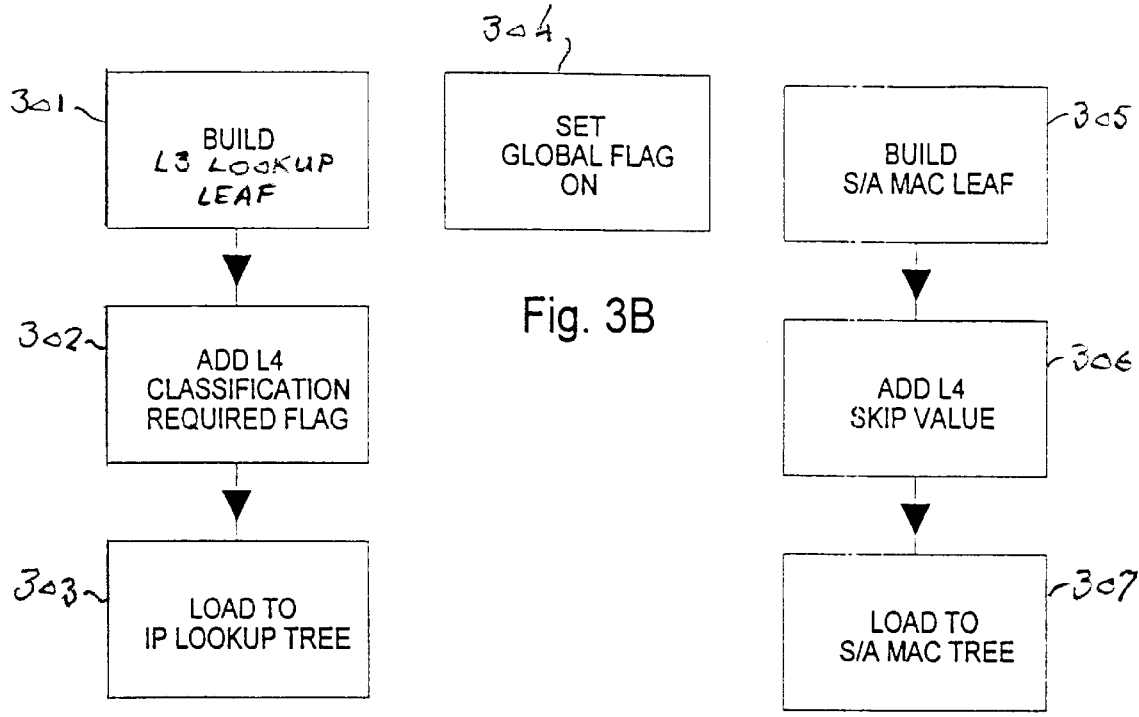
FIG. 3A is a flowchart showing the procedure for a first new flag, called the Classification Required Flag, according to the invention.
FIG. 3B is a flowchart showing the procedure for a second new flag, called the Global Flag, according to the invention.
FIG. 3C is a flowchart showing the procedure for a third new flag, called the L4 skip Classification Flag, according to the invention.

FIG. 3A illustrates the setting of the L4 Classification Required Flag. For the L4 Classification Required Flag, the IP leaf is built in function block 301. Then the L4 Classification Required Flag is added to the leaf in function block 302. Finally, the leaf is loaded to the IP lookup tree in function block 303. This may be a 1 bit flag, with 0=OFF and 1=ON. ON means do L4 classification. This flag can be set ON if a new rule being added to the Software Managed Tree (SMT, i.e., the L4 classification tree) has the same Destination Address (DA) pattern as the leaf in the IP lookup tree. Example is a DA of 1. 1. 1. *.

FIG. 3B illustrates the setting of the Global Flag. The Global Flag is set in memory in function block 303. This may be a 1 bit flag, with 0=OFF and 1=ON. ON means do L4 classification. This flag is set ON any time a new rule is added to the L4 classification tree that can not be correlated to a single leaf in the L3 lookup tree.

FIG. 3C illustrates the setting of the L4 Skip Classification Flag. During build of an SA MAC frame in function block 305, an L4 Skip Value is added to the frame in function block 306. The frame is then loaded to the SA MAC tree in function block 307. The Value is set ON if the MAC address is designated by the user to be a trusted address (i.e., no classification required).

When both the L4 Classification Required Flag and the Global Classification Flag are used together in any of the four embodiments, a restriction applies that both flags can not be set to ON for any given L4 rule.

Figure 4:
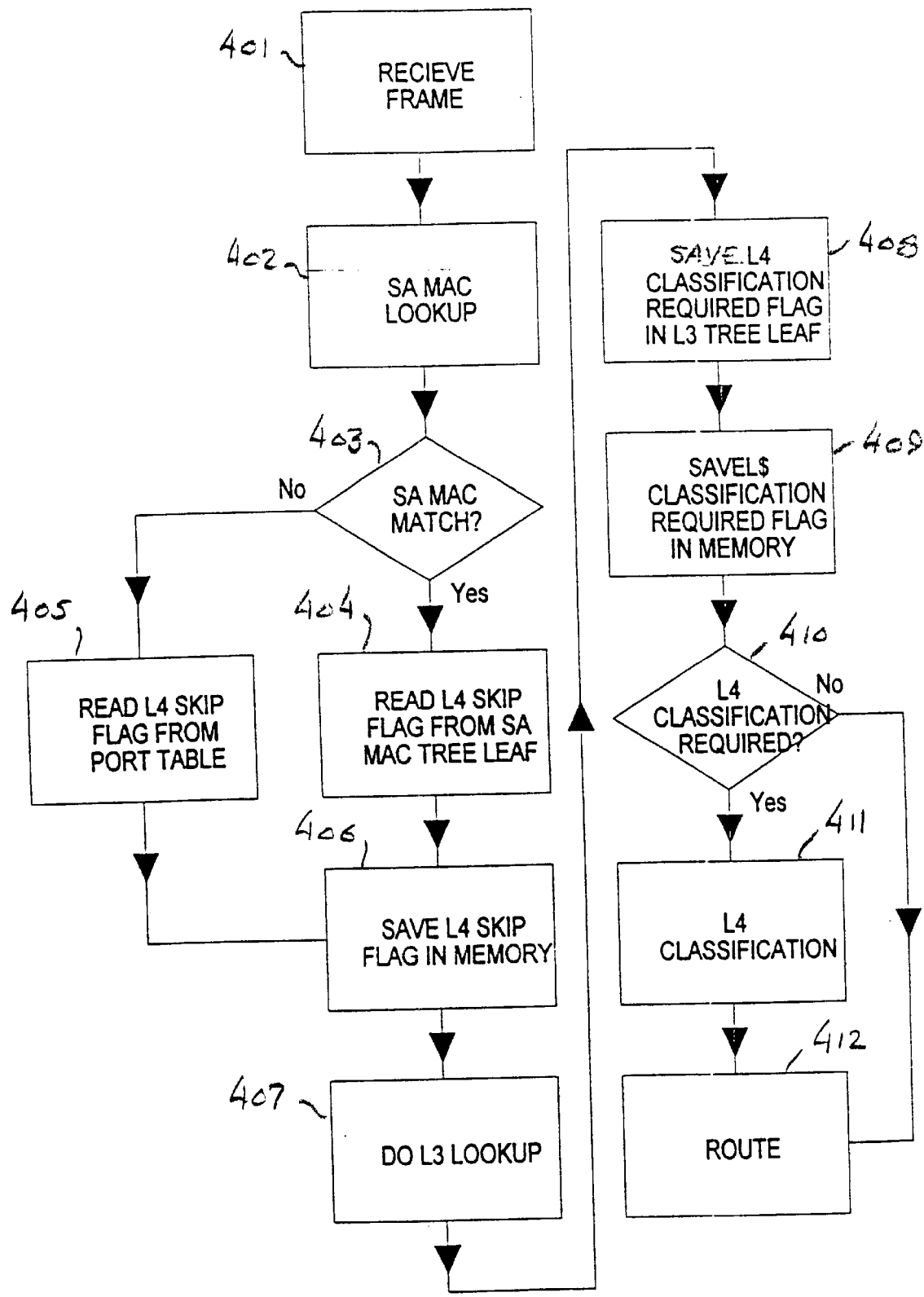
FIG. 4 is a flowchart showing the basic logic of the procedure according to the invention.

FIG. 4 is a flowchart of the basic flow of the invention. A frame coming in for routing is received in function block 401. The frame is first processed by the SA MAC lookup code in function block 402. An optional SA MAC match may be performed in decision block 403, and if a match is found, the L4 Skip Classification Flag is Read from the SA MAC tree leaf in function block 404. If this option has not been invoked or the optional search does not result in a match, the L4 Skip Classification Flag is read from the port table in function block 405. In either case, the L4 Skip Classification Flag is saved in memory in function block 406. Then an L3 lookup is done in function block 407, and the L4 Classification Required Flag saved in function block 408. The value of the L4 Classification Required Flag is saved in memory in function block 409. Next, a determination is made in decision block 410 as to whether an L4 Classification is required. How this done depends upon the particular embodiment of the invention being practiced and is described and illustrated in FIGS. 5, 6 and 7 below. Finally, either an L4 classification in function block 411 followed by routing in function block 412 or just routing is performed.

Figure 5:
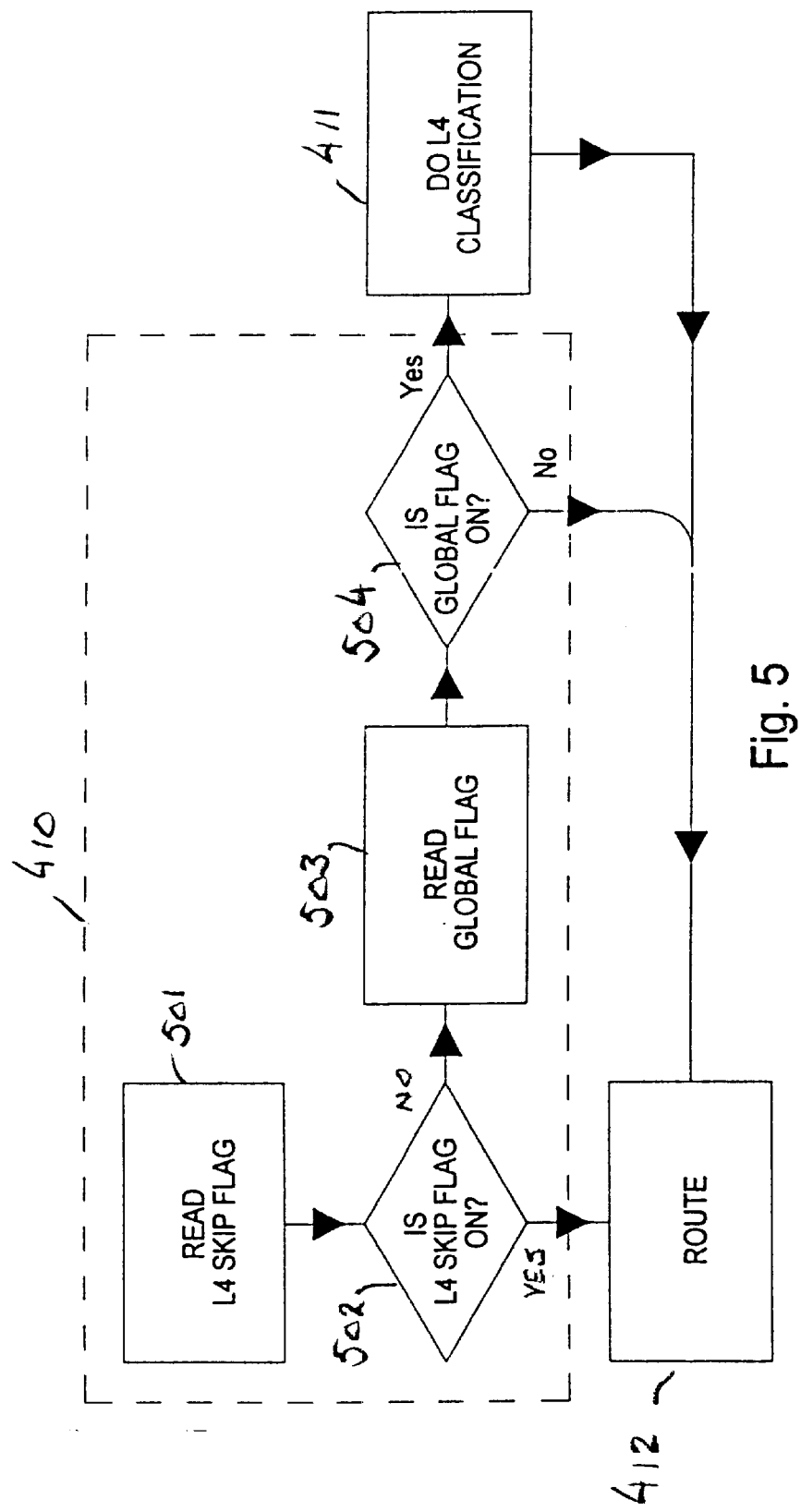
FIG. 5 is a flowchart, expanding on the flowchart of FIG. 4, showing first and second embodiments of the invention.
Figure 6:
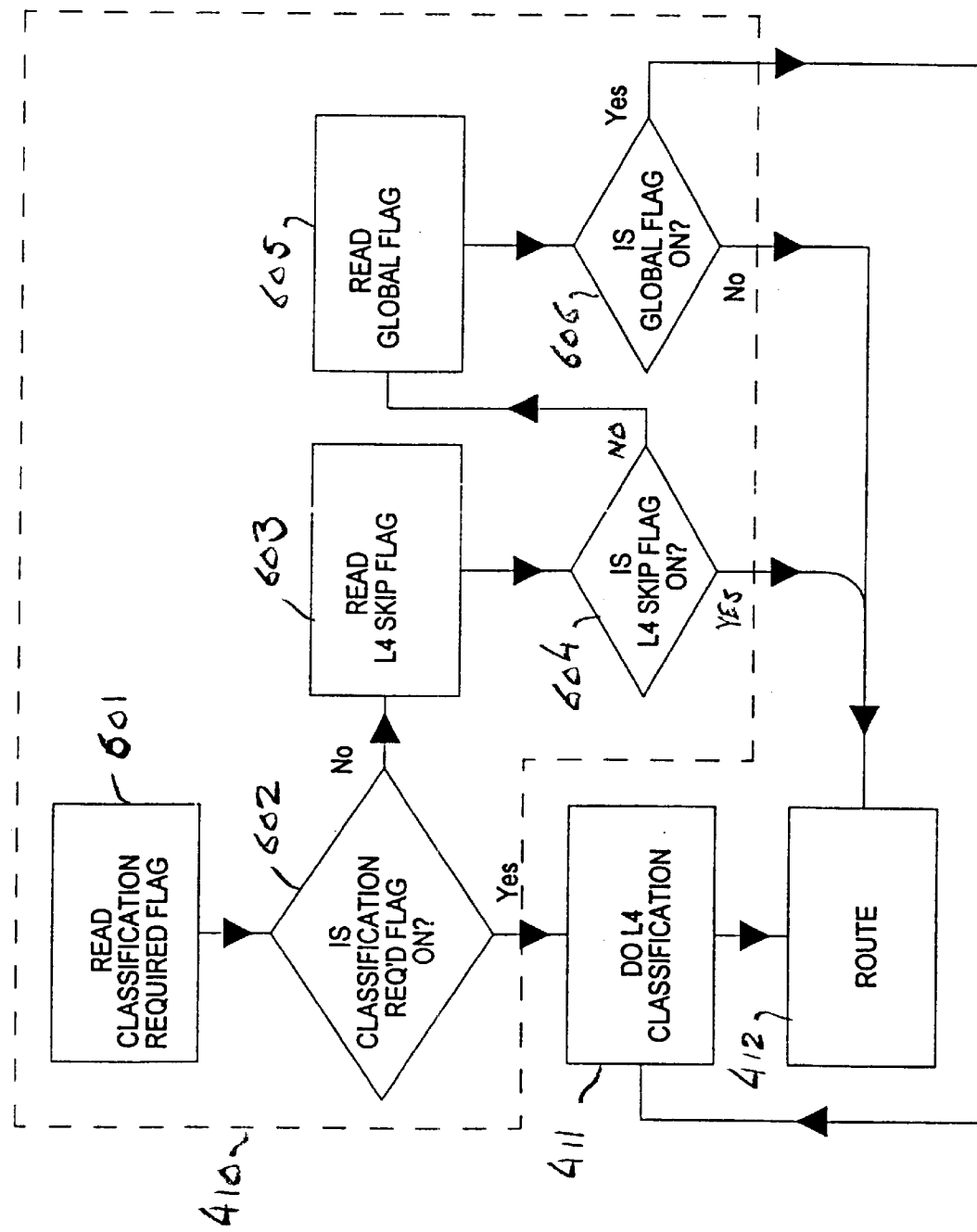
FIG. 6 is a flowchart, expanding on the flowchart of FIG. 4, showing third and fourth embodiments of the invention.

The decision block 410 is expanded in FIGS. 5 and 6 and indicated by dashed lines in those respective figures.

Referring first to FIG. 5, there is illustrated the flow for the first and second embodiments where the L4 skip Classification Flag and Global Classification Flag are used. First, the L4 Skip Classification Flag is read in function block 501. If the L4 Skip Classification Flag is ON as determined in decision block 502, the frame is routed in function block 412. If the L4 Skip Classification Flag is OFF, then the Global Classification Flag is read in function block 503. If the Global Flag is OFF as determined in function block 504, the frame is routed. If the Global Flag is ON, then Layer 4 (L4) classification is done in function block 411 and the frame routed in function block 412. The first embodiment uses the SA MAC lookup, and if there is no match found, use a fixed value of "OFF" for L4 Skip. The second embodiment uses the SA MAC lookup first, and if there is no match found, use the port table to find the default value for L4 Skip. Another option is to use the port table to find the value of the L4 Skip.

The code for the first and second embodiments is as follows:

if L4 skip=OFF/*from SA MAC lookup*/
  if global_flag=ON /*from memory*/
    do L4 classification FIG. 6 illustrates the flow for the third embodiment of the invention where the L4 Classification Required Flag, the L4 skip Classification Flag, and the Global Classification Flag are used. In this flow, the L4 Classification Flag is read in function block 601, and if the L4 Classification Required Flag is ON as determined in decision block 602, the frame L4 Classification is performed in function block 411 and then the frame is routed in function block 412. If the L4 Classification Required Flag is OFF, then the L4 skip Classification Flag is read in function block 603. If the L4 skip Classification Flag is ON as determined in decision block 604, then the frame is routed. If the L4 Skip Classification Flag is OFF, then the Global Classification Flag is read in function block 605. If the Global Classification Flag is OFF, then the frame is routed. If the Global Classification Flag is ON, then Layer 4 (L4) classification is done in function block 411 followed by routing in function block 412. The third embodiment uses the SA MAC lookup, and if there is no match found, use a fixed value of "OFF" for L4 Skip. The fourth embodiment uses this option.

The code for the third and fourth embodiments is as follows:

if classification_req=ON/*from layer 3*/
  do L4 classification
else if L4_skip flag=OFF/*from SA MAC lookup*/ if global_flag=ON/*from layer 4 classifier*/
do L4 classification

While the invention has been described in terms of a preferred embodiments, those skilled in the art will recognize that the invention can be practiced with modification within the spirit and scope of the appended claims.

Having thus described our invention, what we claim as new and desire to secure by Letters Patent is as follows:

1. A method of routing a data packet comprising the steps of:
   inserting into a set of MAC rules in SA MAC lookup means a set of Layer 4 (L4) Skip Classification Flags;
   selecting which rule to apply to said data packet and reading the state of the corresponding L4 Skip Classification Flag;
   in response to a first state of said corresponding L4 Skip Classification Flag, performing a routing of the data packet;
   in response to a second state of said corresponding L4 Skip Classification Flag, reading the state of a Global Classification Flag;
   in response to a first state of said Global Classification Flag, performing a Layer 4 (L4) classification followed by a routing of said data packet; and
   in response to a second state of said Global Classification Flag performing a routing of the data packet.

2. The method of claim 1, wherein said first state of said Global Classification Flag is set when a new rule is added to L4 classification means, said new rule being correlatable to a single entry in Layer 3 (L3) lookup means and said first state of said L4 skip Classification Flag is set by a user determination based on a MAC address in said SA MAC lookup means.

3. The method of claim 2, further comprising the steps of:
   reading the state of said L4 skip Classification Flag from said SA MAC lookup means in response to a key in the data packet matching any rule in said SA MAC lookup table; and
   reading the state of said L4 skip Classification Flag from a port table in response to said key not matching any rule in said SA MAC lookup table.

4. A method of routing a data packet comprising the steps of:
   inserting into a set of Layer 3 (L3) rules in L3 lookup means a set of Layer 4 (L4) Classification Required Flags;
   inserting into a set of MAC rules in SA MAC lookup means a set of Layer 4 (L4) Skip Classification Flags;
   selecting which rule to apply to the packet and reading the state of the corresponding L4 Classification Required Flag;
   in response to a first state of said corresponding L4 Classification Required Flag, performing an L4 classification followed by a routing of the data packet;
   in response to a second state of said corresponding L4 classification flag, reading the state of the corresponding L4 Skip Classification Flag;
   in response to a first state of said corresponding L4 Skip Classification Flag, performing a routing of the data packet;
   in response to a second state of said corresponding L4 Skip Classification Flag, reading the state of a Global Classification Flag;
   in response to a first state of said Global Classification Flag, performing a Layer 4 (L4) classification followed by a routing of the data packet; and
   in response to a second state of said Global Classification Flag performing a routing of the data packet.

5. The method of claim 4, wherein said first state of said Global Classification Flag is set when a new rule is added to L4 classification means, said new rule being correlatable to a single entry in Layer 3 (L3) lookup means and said first state of said L4 Skip Classification Flag is set by a user determination based on a MAC address in said SA MAC lookup means.

6. The method of claim 5, further comprising the steps of:
   reading the state of said L4 Skip Classification Flag from said SA MAC lookup means in response to a key in the data packet matching any rule in said SA MAC lookup table; and
   reading the state of said L4 Skip Classification Flag from a port table in response to said key not matching any rule in said SA MAC lookup table.

* * * * *

UNITED STATES PATENT AND TRADEMARK OFFICE
CERTIFICATE OF CORRECTION

PATENT NO. : 6,654,372 B1
DATED : November 25, 2003
INVENTOR(S) : Arts et al.

It is certified that error appears in the above-identified patent and that said Letters Patent is hereby corrected as shown below:

<u>Title page,</u>
Item [73], Assignee, replace "International Business Machines Corporation, Armonk, NY (US)" with -- International Business Machines Corporation, Armonk, NY (US); Alcatel, Paris, (FR) --

Signed and Sealed this

Twenty-seventh Day of April, 2004

JON W. DUDAS
*Acting Director of the United States Patent and Trademark Office*